United States Patent [19]

Croston

[11] Patent Number: 5,082,204
[45] Date of Patent: Jan. 21, 1992

[54] ALL WING AIRCRAFT

[76] Inventor: Leon J. Croston, Rt. 1, Box 892, Bois d'Arc, Mo. 65612

[21] Appl. No.: 546,550

[22] Filed: Jun. 29, 1990

[51] Int. Cl.$^5$ ............................................. B64C 39/10
[52] U.S. Cl. ..................................... 244/126; 244/13; 244/36; 244/89
[58] Field of Search ............. 244/13, 36, 35 R, 35 A, 244/12.1, 12.6, 45 R, 87, 88, 89

[56] References Cited

U.S. PATENT DOCUMENTS

| | | |
|---|---|---|
| 1,825,578 | 9/1931 | Cernuda . |
| 1,880,520 | 10/1932 | Stout . |
| 1,893,129 | 1/1933 | Charpentier . |
| 1,977,843 | 10/1934 | Baume ................... 244/14 |
| 2,123,096 | 7/1938 | Charpentier ............ 244/130 |
| 2,402,358 | 6/1946 | Bauman .................. 244/13 |
| 2,405,907 | 8/1946 | Schmitt ................. 244/13 X |
| 2,406,506 | 8/1946 | Northrop ............... 244/13 |
| 2,412,646 | 12/1946 | Northrop et al. ........ 244/13 |
| 2,476,482 | 7/1949 | Custer .................. 244/12.6 |
| 2,650,780 | 9/1953 | Northrop et al. ........ 244/119 X |
| 2,670,155 | 2/1954 | Sahl .................... 244/13 |
| 2,937,827 | 5/1960 | Duce .................... 244/65 |
| 3,216,673 | 11/1965 | Alter et al. ............ 244/12 |
| 3,625,459 | 12/1971 | Brown ................... 244/35 |
| 3,680,814 | 8/1972 | Geary ................... 244/13 |
| 3,761,041 | 9/1973 | Putman .................. 244/13 |
| 4,019,699 | 4/1977 | Wintersdorff et al. ..... 244/121 |
| 4,149,688 | 4/1979 | Miller, Jr. ............. 244/12.4 |
| 4,901,950 | 2/1990 | Judge ................... 244/87 X |

OTHER PUBLICATIONS

Flight International, 4–10 Jul. 1990, "Building the B-2", pp. 24–27.

Primary Examiner—Joseph F. Peters, Jr.
Assistant Examiner—Carla Mattix
Attorney, Agent, or Firm—Hovey Williams Timmons & Collins

[57] ABSTRACT

An all-wing aircraft is disclosed that has novel foreplane and depending aftplane, a center wing section and outer wing panel flying surfaces which cooperate aerodynamically to eliminate the need for conventional fuselage and tail structures. The foreplanes are strategically located to create a positive pitching moment which is sufficient to significantly reduce elevator forces and to balance the negative pitching moment induced by the outer wing panels and the downwardly extending aftplane units that provide static and dynamic pitch and yaw stability. At the same time, the foreplane structures serve as an unobstructed means to mount engines forward on the airframe to established a forward empty center of gravity. Additionally the aftplane structure serves as a means to mount main landing gears, elevators, ruddervators and to provide structural means for interconnecting outboard wing sections of the airplane.

The all-wing design is of a nature permitting adoption of the principles thereof in either a multi-engine airplane or single-engine airplane. In both instances, a center wing section, foreplane and aftplane structures and outer wing sections cooperate to provide stability in all three axes of movement of the airplane while decreasing fuel burn by virtue of an improved lift to drag ratio and empty weight reduction by removal of the conventional fuselage and tail structures.

30 Claims, 3 Drawing Sheets

ALL WING AIRCRAFT

BACKGROUND OF THE INVENTION

1. Field of the Invention

This invention relates to aircraft and especially an airplane of the tailless, all-wing type.

2. Description of the Related Art

Although aircraft have been undergoing evolutionary changes from their conception almost ninety years ago, airplane design has centered around provision of a central fuselage which supports wing structure and a tail assembly rearwardly from the wing. Conventionally, that tail assembly has been made up of vertical and horizontal stabilizers. Periodically, the wing, which serves as the principal means for supporting the airplane has been supplemented with a forwardly located canard on the fuselage. However, the greatest advances have been in the area of propulsion and particularly the development of turbojet engines.

An airplane moves about three axes through the center of gravity. Thus, means is provided to stabilize and control pitch, yaw, and roll. Static stability means the airplane tends to remain in straight and level flight if properly trimmed until that stability is disturbed. Dynamic stability means that the airplane will tend to return to straight and level flight if displaced by a transitory unbalancing force. Wing dihedral and the tail assembly have been the principal means of providing static and dynamic stability.

Efforts to eliminate the drag producing fuselage and tail surfaces of airplanes have for the most part been unsuccessful primarily because aeronautical engineers were unable to solve the instability and other compromising engineering problems found to be inherent in previously suggested all-wing aircraft designs.

It has long been known that an all-wing airplane would have distinct advantages over conventional types if the stability problems and other engineering compromises could be overcome. An all-wing aircraft has a superior lift to drag ratio because nearly all of the exposed parts create lift. Furthermore, elimination of the fuselage decreases the empty weight of the airplane and loads are distributed over the span of the wing making heavily reinforced structures unnecessary. An all-wing aircraft is able to carry a fixed weight farther and more economically than a conventional airplane having a wing and tail structure secured to the fuselage.

Portions of the fuselage have been used to store cargo and fuel and to house passengers, but relatively large portions of the fuselage still remain hollow and unused.

Recognizing that the fuselage and tail surfaces were responsible for significant drag, design efforts have focused on reduction of parasitic drag created by structures that project outwardly from the aircraft but do not contribute directly to lift. When the assumption is made that an airplane requires only a wing for support in the air, it necessarily follows that the need for the rest of the airplane is questionable and creates parasitic drag.

When efforts were previously made to bring a conventional wing-fuselage-tail assembly airplane into closer conformance to the efficiencies and economies of an all-wing aircraft, the results were for the most part fruitless. For example, increasing the fuel load to gain more range requires an increase in the size of the airplane to carry the additional fuel. A larger engine is then needed to power the bigger airplane. Increased fuel consumption because of the need for a higher horsepower propulsion plant means more fuel must be provided which then requires greater lift, larger surfaces, ad infinitum. There is no substitute for decreasing the empty weight of an airplane and having a much greater lift to drag ratio.

The advantages of all-wing airplane designs have long been known and proposals have been made to eliminate the tail surfaces and fuselage structure of airplanes but with little success. One design that came the closest is illustrated and described in U.S. Pat. No. 2,406,506 to John K. Northrop of Northrop Aircraft, Inc. The Northrop "Flying Wing" which was actually built and tested beginning in the 1940s, never became a commercial design. Some of the reasons were stability difficulties and limitations that the elevons imposed on the maximum coefficient of lift at take-off and landing.

The Northrop wing employed a near-symmetrical airfoil incorporating reflex camber at the trailing edge and no dihedral. Control of the Northrop wing in flight was accomplished by providing movable sections along the trailing edge of the wing. Two trim sections were provided with each being located near a respective wing tip. Larger sections inboard of the trim flaps served as a combination aileron and elevator denominated an "elevon". The trim flaps had a combination pitch and roll trim function. The rudders acted as drag surfaces to create a yawing moment rather than a conventional deflection-type rudder. Each rudder was hinged to an electrically-operated trim flap. The rudders moved with the trim flaps for trim purposes but operated independently for yaw control. Foot pressure on one of the rudder pedals opened a corresponding rudder; its surfaces split deflecting above and below the trim flaps.

Lack of success of the Northrop flying wing design can be attributed to a number of most obvious reasons. They included: complaint by pilots of the lack of inherent stability making it impractical to fly the airplane hands-off; use of the elevons negatively affected the maximum coefficient of lift; the lever arm of the elevons was too short in relation to the center of gravity; a download was required on the elevons and trim flaps in an effort to maintain pitch stabilization; the elevons and trim flaps were unable to trim out the negative pitching moment caused by high speed compressibility center of lift shift in an aft direction; nearly ineffective flaps; engine placement requiring extension drives to maintain the empty center of gravity within the center of gravity envelope in the case of the propeller-driven configuration; and lack of static yaw stability.

An especially significant drawback of the Northrop all-wing aircraft was loss of maximum lift coefficient at take-off and landing. The elevons, made up of movable segments of the wing's trailing edge and hinged to act as a combination aileron and elevator, provided pitch control and pitch trim. The movement of this surface changed the camber of the attached airfoil and therefore affected wing lift, drag, and pitching moment. When these surfaces moved up, it reduced wing camber and therefore wing lift, reducing the wing's maximum lift coefficient by 20 to 40%, just when the most lift was needed, at lift-off and landing. The results were take-off, stall and landing speeds considerably higher than with a conventional airplane.

Another significant drawback was that the lever arm for each of the elevons providing pitch control action were too short. This meant that the wing's center of gravity was maintained forward of the center of lift. As a result, a negative pitching moment was generated which in turn had to be counterbalanced by deflection of the elevons upwardly, creating a download to control and trim the airplane about the pitch axis. The short distance of the elevons in relation to the center of gravity and their small surface required them to generate a significant down force to stabilize the airplane about the pitch axis, thus negating a well established proposition that all surfaces of prior art flying wings generated lift. In reality, the Northrop elevons created considerable down force.

A further significant drawback of the Northrop elevon and trim flap arrangement was inability to trim out the negative pitching moment caused by high speed compressibility center of lift shift in an aft direction. The shock waves that developed at high air speeds and high altitudes during operation of the Northrop wing caused the center of lift to move aft on the wing, increasing the distance from the center of gravity to the center of lift, and generating an even greater down pitching moment that eventually overpowered the trim flaps and elevons and placed the airplane in an uncontrollable nose down attitude. The elevons were proposed as a means to meet the combined requirements that the airplane be both statically and dynamically stable and in trim throughout the entire flight envelope. In fact, the many negative qualities of the elevons demonstrated that they were incapable of meeting these requirements.

In addition, the engine placement of the Northrop flying wing required extension drive lines to maintain the empty center of gravity in required deposition in the case of a propeller-driven configuration. The configuration of the flying wing did not permit unobstructed placement of engines forward on the wing to establish an empty forward center of gravity without the use of extension drive shafts for the propellers. Even when pure jets were substituted for a propeller-driven design, the jet engine installation required extended intake ducting with accompanying inlet friction drag.

The hinge points of the inboard flaps of the Northrop flying wing were in close proximity to the hinge point of the elevons. The result was a near self-defeating condition. As the flaps were deployed, a strong nose down pitching moment was induced. To offset this, the elevons and trim flaps were automatically trimmed up. Because of the relative hinge points and relations to the center of gravity, the net result was near zero for increased lift coefficients and a large increase in drag.

The combination pitch and roll trim flaps near the tips of the Northrop wing were also drag producing devices by virtue of the fact that they split, deflecting above and below the trim flaps, creating yawing forces but did not provide for static yaw stability. As a consequence, the wing tended to stray from straight flight when the wing was subjected to the slightest unbalancing force. Northrop's wing had very little static stability about the yaw axis. Sweep back of the leading edge of the wing did provide some weather-cock stability but not enough for satisfactory handling characteristics.

It therefore necessarily follows that the Northrop wing was inherently unstable and not capable of fully stabilized flight. At that point in time, stability augmentation computer technology was not available for operating the control surfaces of an airplane which is inherently unstable. Such techniques do exist today but are expensive, they are not without operating flaws, the systems are unable to control an aircraft once it is outside of its normal flight envelope, and the techniques involve design limitations which restrict the overall utility of the airplane. An airplane that has inherent aerodynamic stability and has a performance envelope just equal to a computer control airplane would still be superior by virtue of the fact that there are no electronic complexities to potentially fail.

So-called V/STOL "lifting body" aircraft are shown and described in Aereon Corporation U.S. Pat. Nos. 3,761,041 and 4,149,688, but these are not all-wing airplanes comparable to the Northrop Flying Wing, or the all-wing airplane of this invention, in that they are essentially triangular in form and do not have stability augmenting surfaces as now provided.

Baume in U.S. Pat. No. 1,977,843 illustrates a flying machine somewhat symbolic of the Arabian Nights Flying Carpet but there is no evidence that this design was ever commercialized or found to have satisfactory flying characteristics. In like manner, the tailless flying wings of Charpenter in U.S. Pat. Nos. 1,893,129 and 2,123,096 were said to incorporate air foils for improved air flow over the wing surface, but control stability was not specifically addressed.

The Delta wing airplane of U.S. Pat. No. 3,625,459, which is somewhat reminiscent of a flying bat, suggested that directional control could be provided by canted wing tip "rudderizers". No assertion was made that the proposed design would be inherently stable.

Other patents disclosing various types of non-conventional flying surface structures include U.S. Pat. Nos. 4,019,699, 1,880,520, 2,937,827, 2,670,155, 1,825,578, and 3,216,673.

BRIEF SUMMARY OF THE INVENTION

The all-wing aircraft of this invention has airfoil defining foreplane means associated with the wing sections which is oriented relative to the center of lift and gravity in disposition to generate a positive pitching moment while the aircraft is in flight. The foreplane assemblies making up the foreplane means are joined to the associated wing sections in a manner such that the foreplane does not present wing tips which would produce drag inducing wing tip vortices.

The all-wing aircraft has a center airfoil section which may either be a wing section or a combination wing section and foreplane assembly which serves as a platform for the cockpit of the airplane and that replaces the fuselage of a conventional airplane. Airfoil outer wing sections are joined to opposed sides of the center section.

Aftplane means associated with the wing sections is made up of at least two airfoil defining, generally planar members which extend downwardly below the wing sections in disposition so that air may flow over each of the planar members as well as the space between such members. The planar members of the aftplane means are dimensioned and located to enhance the static and dynamic pitch and yaw stability of the airplane.

The trailing edges of the outer wing sections are provided with movable means for controlling rolling movement of the aircraft, while shiftable means is located inboard on either the outer wing sections or the aftplane means or both to permit pitch attitude control.

Power propulsion drive means is carried by the wing means for imparting forward motion to the aircraft.

In a preferred all-wing multi-engine embodiment of the invention, airfoil foreplanes between the outer wing sections and opposed sides of the center wing section generate a positive pitching moment to relieve most of the downloads on the elevators, enhance pitch control, serve as supports for the power plants, allow mounting of efficient flaps at a forward position relative to the center of lift and gravity of the combined wing sections, allow for a trim function as the center section flaps are deployed, and provide high energy air ducted over the aftplanes.

A preferred all-wing single engine embodiment has a centrally located combination foreplane and center wing section which generates a positive pitching moment, has all of the other functions of the multi-engine foreplane, and supports the cockpit and propulsion plant. Aftplane means extending below the central foreplane, as well as outer wing sections projecting from opposed sides of the central wing section, enhance the static and dynamic pitch and yaw stability of the airplane and also provides means for mounting control ruddervators.

The single engine as well as multi-engine embodiments of the invention are more efficient than conventional aircraft by virtue of elimination of the fuselage and usual tail assembly and because the foreplanes relieve most of the download on the elevators. In addition, the present design is inherently more statically and dynamically stable than previously suggested all-wing aircraft, particularly because of the provision of foreplanes which generate a positive pitching moment while the airplane is in flight, and aftplanes which enhance static and dynamic yaw and pitch stability.

DETAILED DESCRIPTION OF THE MULTI-ENGINE ALL-WING AIRCRAFT EMBODIMENT

The all-wing multi-engine aircraft 10 illustrated in FIGS. 1-4 inclusive has utility not only as a full size airplane, but also in significantly smaller formats for use as a pilotless drone or target aircraft, and even in small scale R/C applications.

Figure 1:
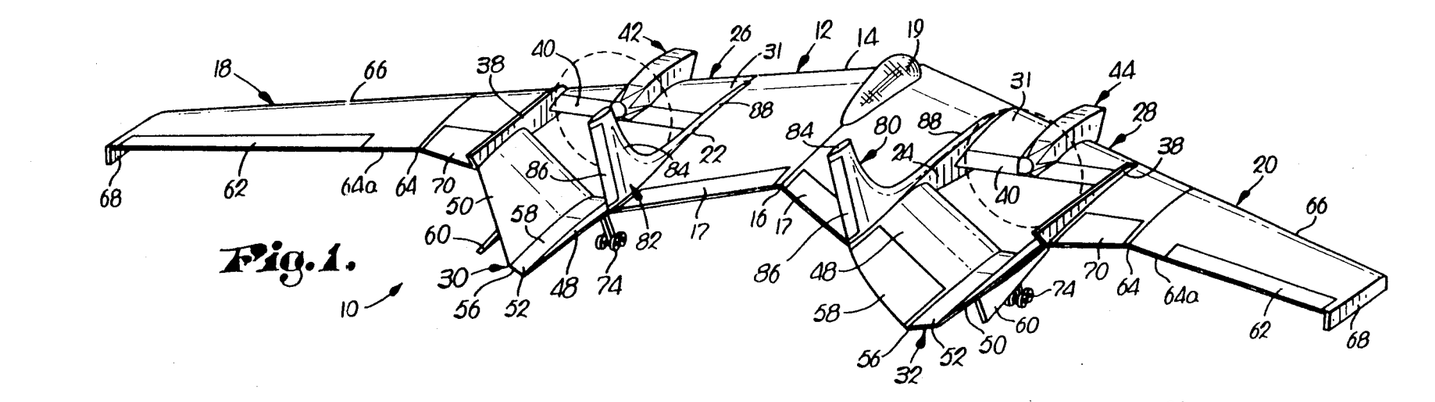
FIG. 1 is a rear quarter perspective view of the preferred multi-engine embodiment of the present invention.
Figures 2, 3, 9:
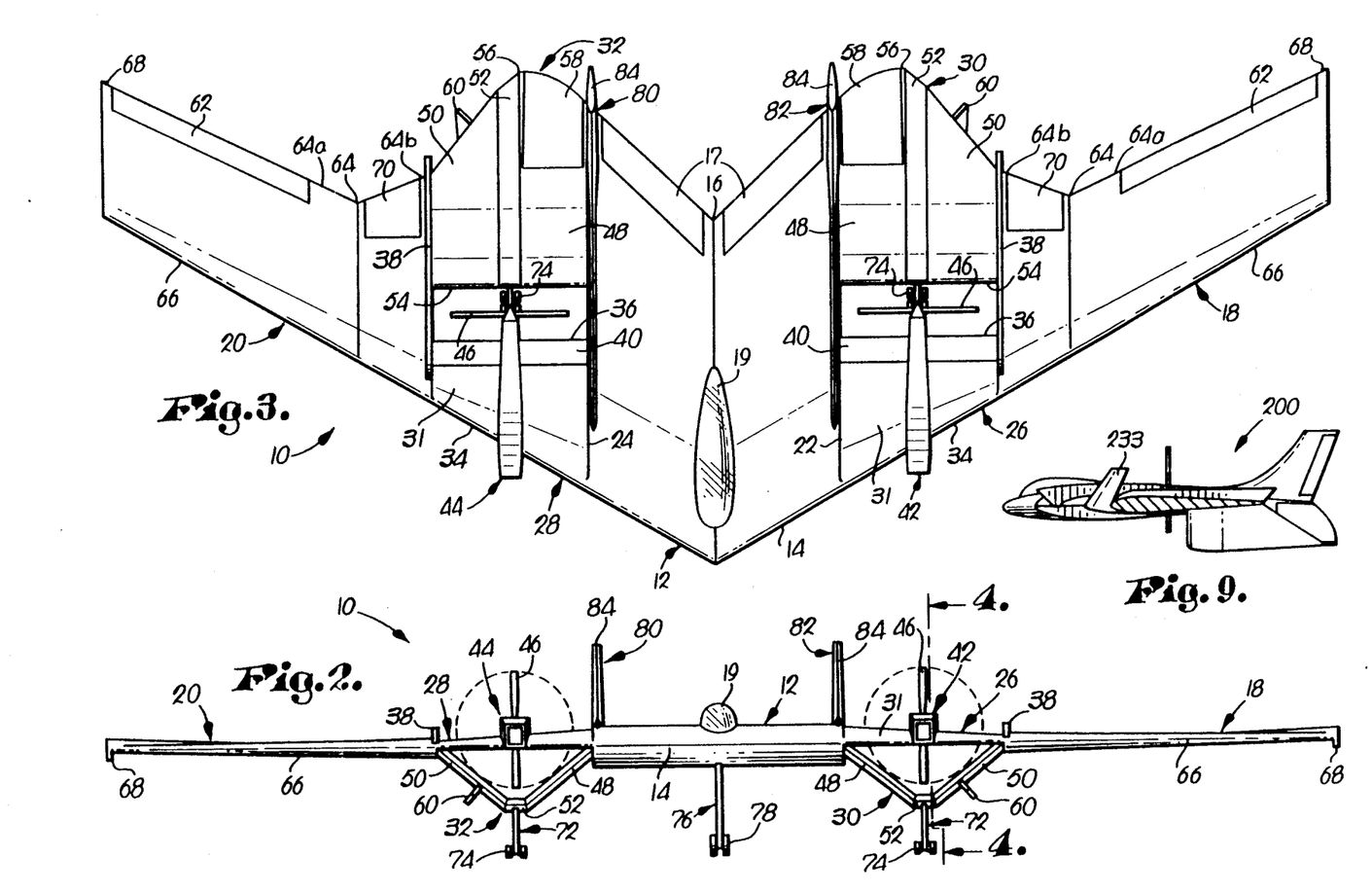
FIG. 2 is a front elevational view of the multi-engine embodiment of the invention.
FIG. 3 is a plan view of the multi-engine all-wing airplane of FIGS. 1 and 2.
FIG. 9 is a small scale cross-sectional view of the aircraft as depicted in FIG. 8 taken on a view through the zone of juncture of the outer wing section with the fore and aftplanes to illustrate the winglets provided immediately inboard of each of the outer wing sections.
Figure 4:
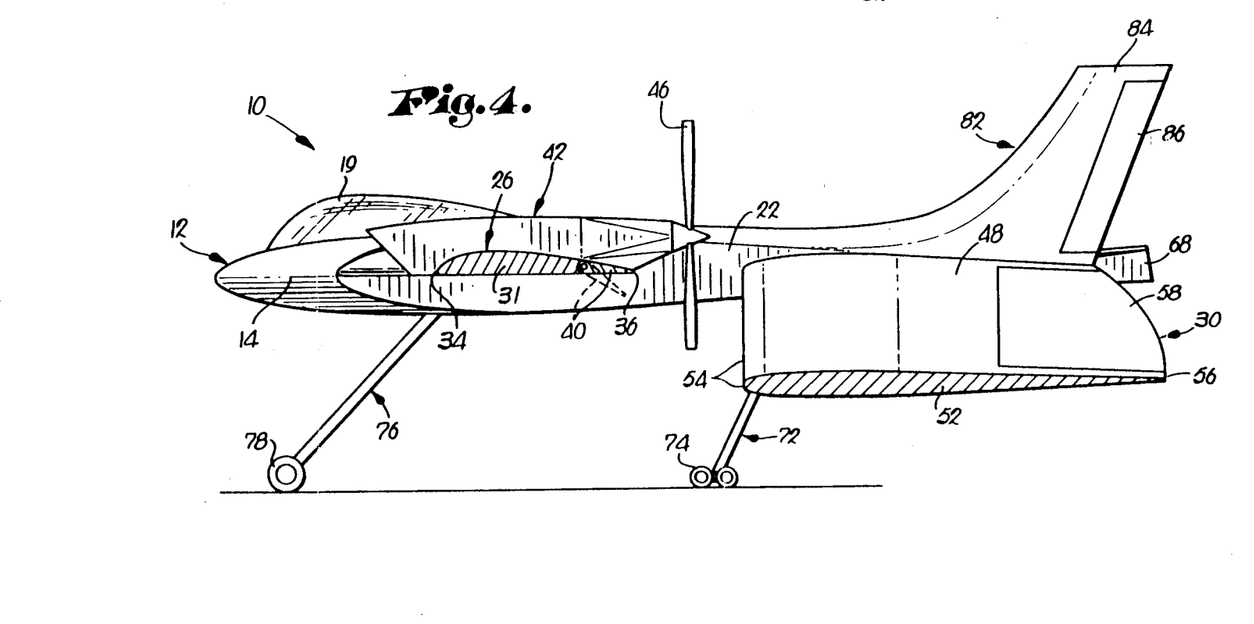
FIG. 4 is an enlarged vertical cross-sectional view taken substantially along the line 4—4 of FIG. 2.

As is evident from FIGS. 1, 2 and 3, multi-engine all-wing aircraft 10 has a center wing section broadly designated 12 which is provided with a leading edge 14 that is generally V-shaped so that the margins of the leading edge diverge toward the rear of the aircraft. Center wing section 12 also has a trailing edge 16 that is of generally V-shaped configuration substantially complemental with the V configuration of leading edge 14.

When the design of this invention is embodied in a multi-engine aircraft for full scale operation, an operational cockpit 19 may be incorporated in the center wing section. The cockpit structure for the pilot or other crew members is shown only schematically in the Figures to indicate a preferred location for the crew control area.

The center section 12 of aircraft 10 is configured to define an airfoil shape between the leading edge 14 and trailing edge 16 which is of relatively uniform chord width throughout the span of such section. It is also desirable that a pair of downwardly deployable flaps 17 be provided on each segment of the trailing edge 16 of center wing section 12 as depicted in FIGS. 1 and 3.

Outer wing sections 18 and 20 are joined to opposed sides 22 and 24 of center wing section 12 by corresponding foreplane assemblies 26 and 28 and aftplane units 30 and 32 respectively.

Each of the foreplanes 26 and 28 is made up of an airfoil defining generally planar element 31 connected to a respective outer wing member 18 and 20 and opposed sides of the center wing section 12. In this manner, it can be seen that the corresponding outer wing sections 18 and 20 are spaced outwardly from the center wing section 12. The planar elements 31 each have a leading edge 34 and a trailing edge 36. As is most evident from FIG. 4, the foreplanes 26 and 28 define airfoils in a direction extending from the leading edge thereof to the trailing edges. However, the foreplanes are of significantly lesser chord width than the center wing section or either of the outer wings. Furthermore, the foreplanes are transversely substantially thinner than the center section and not as thick as the adjacent portion of respective outer wing sections. If desired, upstanding wing fences 38 may be provided along each of the inside edges of outer wing sections 18 and 20 at the zone of merger of foreplanes 26 and 28 with corresponding outer wings.

Viewing FIG. 3, it can be seen that the leading edges 34 of the foreplanes 26 and 28 merge smoothly with the V-shaped leading edge 14 of center wing section 12. However, the trailing edges 36 of foreplanes 26 and 28 are perpendicular to the longitudinal axis of aircraft 10.

It is preferred that each of the foreplanes 26 and 28 be provided with downwardly deployable flaps 40 along the full length of the trailing edges thereof. The pivot points for flaps 40 are only slightly above the fore and aft center line of the center wing section 12.

Foreplane assemblies 26 and 28 also serve as a convenient mounting position for propulsion means in the form of power plants 42 and 44. These propulsion units may either be of the tractor or pusher propeller type, or turbojets. In the preferred embodiment illustrated in FIGS. 1-4, the engines 42 and 44 are of the pusher type mounted directly on the top of respective foreplane assemblies 26 and 28 with the props 46 positioned to rotate in the space between flaps 40 and rearwardly disposed aftplane units 30 and 32. When a propeller power plant is employed, and 8 to 10 blade turbo-prop jet engine is preferred with the propellers being unshrouded and in the pusher position. The prop fans exit slipstream will not come into contact with the upper surfaces of the aftplane units 30 and 32. This is one reason the aftplane units are of U, V or box shaped configuration so that their airfoils are not in the way of the propeller slipstream.

Each of the aftplane units 30 and 32 is of generally V-shaped configuration and embodies a pair of downwardly extending, airfoil defining planar members 48 and 50 which converge as the lower extremities thereof are approached and joined by airfoil defining lower aftplane segments 52. The members 48 and 50 and the segments 52 are of essentially the same effective maximum chord width and of transverse or span dimensions approximately equal to those of foreplane elements 31. The leading edges 54 of aftplane members 48 and 50 and segments 52 are aligned transversely of aircraft 10 perpendicular to the longitudinal axis of the airplane, and parallel with the trailing edges 36 of foreplanes 26 and 28. As shown in FIG. 3, the leading edges 54 of members 48 and 50 and segments 52 are located rearwardly of the trailing edges 36 of foreplane assemblies 26 and 28 to permit free rotation of propellers 46 in the vertical zone therebetween.

Members 48 and 50 extend downwardly a sufficient distance to project below center section 12 as well as outer wing sections 18 and 20. The members 48 and 50 are of dimensions and in disposition to impart pitch and yaw stability to the aircraft 10 in its flight regime. The trailing edges 56 of members 48 and 50 and segments 52 define a curvilinear surface as best shown in FIG. 3 which extends rearwardly in a direction from the uppermost edge of each member 48 to the lower rearmost edge thereof which merges with a corresponding segment 52, and then curves back forwardly as the uppermost rear margin of a corresponding planar member 50 is approached.

Each of the aftplane members 48 is desirably provided with upwardly and downwardly movable elevators or ruddervators 58 for permitting selective control of the pitch and yaw attitude of the aircraft 10.

Although in the preferred embodiment of multi-engine aircraft 10, the aftplane units 30 and 32 are of V-shaped configuration as illustrated with the lower margins of members 48 and 50 merging into a normally horizontally extending fore and aft airfoil defining planar segments 52, it is to be appreciated that the segments 52 may be eliminated with the planar members 48 and 50 merging one into the other to form a truly V-shaped structure. Other variations include aftplane units which are transversely rectangular in configuration with the members 48 and 50 being in vertical disposition perpendicular relationship to the transverse axis of aircraft 10 and joined by a lower horizontal segment 52 extending the full distance below the lower margins of such upright members 48 and 50. Another variation involves segments 52 which are of greater transverse width than those depicted in the drawings with the angularity of respective planar members 48 and 50 with respect to the horizontal being greater than shown in FIG. 2, and elevators provided on segment 52. Other alternatives include members 48 which are perpendicular to the transverse axis of aircraft 10 while angular planar members 50 merge with the lower margins of the upright planar members 48, as well as the obverse of that arrangement wherein the outboard planar members 50 are in vertical orientation while angular members 48 converge with the lower extremities of the members 50. In the latter two instances, it normally would not be necessary to provide intermediate sections similar to the sections 52 illustrated in FIGS. 1-4 inclusive.

In certain instances, it is desirable to provide trapezoidal shaped yaw augmenters or strakes 60 which extend downwardly and project outwardly from the outermost lower surfaces of respective aftplane members 50 in closer spaced relationship to segments 52 than outboard wings 18 and 20. These yaw augmenters cooperate with the aftplane members 48 and 50 to assist in static yaw stability to reduce spanwise flow of air under the aftplanes. This creates the effect of a vertical stabilizer surface equal to the distance measured from the leading edge of the yaw augmenter to the under surface of respective outer aftplane members 50.

For larger sizes of multi-engine aircraft embodying the principles of this invention, it may be desirable in certain instances to provide additional elevators or ruddervators for pitch control. This may be accomplished by adding movable control surfaces to the trailing edges of outboard planar members 50 and 52. In that event, the strakes or yaw augmenters 60 should either terminate ahead of the movable elevator or ruddervator section of planar members 50, or a trailing portion of the strake directly opposite the movable elevator or ruddervator configured to move with that shiftable section of outboard planar member 50.

Another alternative for improving pitch control may take the form of mounting of strakes or yaw augmenters 60 for pivoting movement about an axis extending transversely of a respective augmenter 60, perpendicular to the adjacent planar surface of member 50, and thereby movable in coordinated association with shifting elevators or ruddervators 58. Viewing FIG. 2, it can be seen that the strakes or yaw augmenters 60 in this alternative embodiment would be deflectable such that the leading and trailing edges of the strake or augmenter 60 would deflect in a circular path with the leading edges of such strakes moving upwardly as the trailing edges thereof move downwardly, and vice versa.

Each of the outer wing sections 18 and 20 is provided with movable means for controlling roll of the aircraft and preferably comprising ailerons 62 on the trailing edges 64 of each outboard wing 18 and 20 adjacent the outer extremities thereof. Ailerons 62 extend a substantial part of the lateral length of each of the outboard wing sections 18 and 20. It is also to be observed from FIG. 3 that the leading edges 66 of outboard wing sections 18 and 20 are at the same angle as the leading edges 34 of foreplane assemblies 26 and 28, and of center wing section 12. Downturned wing tip extensions 68 may also be provided at the outer end of each of the wing sections 18 and 20 to assist in reducing spanwise airflow.

The outboard segments 64a of trailing edges 64 of outer wing sections 18 and 20 are generally parallel with leading edges 66. The inner segments 64b of trailing edges 64 extend rearwardly of the wing sections 18 and 20 and merge with the trailing edge 56 of aftplane units 30 and 32 respectively. Trailing edge segments 64b of trailing edges 64 are provided with deployable flaps 70 which operate in conjunction with flaps 40 on foreplane assemblies 26 and 28 and flaps 17 on center section 12.

Aftplane units 30 and 32 also serve as means for supporting main undercarriage assemblies 72 having wheel trucks 74 while a nose gear assembly 76 having a nose wheel truck 78 projects downwardly from the undersurface of center wing section 12.

Vertical stabilizers 80 and 82 at the outer side margins 22 and 24 of center wing section 12 each have swept back vertical stabilizer structure 84. An upright, deflectable rudder 86 is provided at the rear extremity of each structure 84.

Another variation of the invention involves mounting of vertical stabilizers 80 and 82 on segment 52 vertically and in perpendicular relationship such that the propeller slipstream flows around the vertical stabilizers 80 and 82.

FUNCTIONAL DESCRIPTION OF FUNDAMENTAL COMPONENTS OF THE MULTI-ENGINE ALL-WING AIRCRAFT

A. Center Wing Section

The center wing section 12 of all-wing aircraft 10 serves at least two important functions: (1) section 12 takes the place of the fuselage normally provided in a conventional airplane; and (2) it also serves as a mounting platform for the main flaps of the aircraft.

Center wing section 12 has a span which is approximately 20% of the total wing span. It is to be understood though that the 20% relationship of a preferred embodiment is not a fixed value, and can be varied depending upon the design mission of a particular airplane. Furthermore, the size and type of airfoil of the center section 12 determines the size and airfoil type of the rest of the wing. These airfoils must be coordinated to maintain the optimum center of lift in relationship to the center of gravity and therefore pitch-trim stability.

In the preferred embodiment of all-wing aircraft 10, the empty center of gravity of the airplane is very near the midpoint of the center wing section chord. This allows for nearly equal space being available forward and aft of the optimum inflight center of gravity. Thus, the empty center of gravity is approximately at the optimum inflight center of gravity. By strategically locating the engines 42 and 44 relative on the foreplanes 26 and 28, the airplane's empty center of gravity may be positioned at a near optimum flight location.

It can also be observed from FIG. 3 that flaps 17 have a horizontal extent which is approximately that of the center wing section, and are hinged at approximately 20% center section chord, deploying in unison with all other flaps. This provides a very effective flap function.

B. Foreplane Assemblies

Foreplane assemblies 26 and 28 serve a number of important functions. They provide: (1) a positive pitching moment to relieve most of the downloads on elevators 58; (2) a surface for power plant placement forward on the airframe; (3) a mounting location for flaps which can be positioned in close proximity to the center of gravity of the aircraft; (4) a forward trim function during center wing section flap deployment; and (5) ducting of high energy air over the aftplane units at slow aircraft speeds.

Foreplane assemblies 26 and 28 are not canards in the true sense of that terminology as used in aircraft design and hence the designation of these components as "foreplanes". Their function is not pitch control as is the case of a canard. Instead the foreplanes produce a very positive pitching moment that relieve a significant portion of the download on respective elevators 58.

In addition, canards as now in use in aircraft are placed far enough ahead of the center of gravity to provide a lever arm long enough to allow a reasonably small canard surface in relation to the main wing to still be effective for controlling pitch and trim. These canards inherently generate wing tip vortices with a consequent increase in induced drags. The foreplane assemblies of aircraft 10 have no wing tips and therefore do not generate wing tip vortices.

The need for a positive pitching moment arises in any airplane design because the static pitch stability is dependent on the relative position of the center of gravity and the center of lift. To be stable, the center of gravity must be forward of the center of lift; therefore the lift is acting behind the center of gravity and will cause a negative pitching moment. In order for the airplane to fly level and be stable in trim, a positive pitching moment must be induced to counteract the negative moment generated by lift. A conventional airplane design accomplishes this with a horizontal tail that has a download. Unlike conventional airplanes, aircraft 10 does not have a separate surface such as a tail or canard to generate positive pitching moments to trim the airplane. Therefore, the wing design must create a positive pitching moment.

In the instance of the Northrop Flying Wing, positive pitching moments were sought by selecting a nearly symmetrical airfoil with reflex, and which was then equipped with outboard trailing edge elevons. The airfoil had positive camber over its forward portion and negative camber over its aft portion to control pitching moments. The amount of reflex required was ascertained by the desired pitching moments and the amount of positive camber in the forward portion of the airfoil. Although this airfoil structure was required to meet stability requisites, these airfoils have a lower maximum lift coefficient than conventional cambered airfoils.

The lift generated by foreplane assemblies 26 and 28 relieves most of the download on the elevators 58, thereby significantly reducing the overall drag of the airplane. In a typical airplane having a fuselage with an empanage, the download required on the elevators, or on the elevons in the case of a flying wing such as the Northrop wing, is equal to 10% or more of the total airplane weight. This requires the wings to lift 10% more than the gross weight of the airplane to remain in stable trimmed flight.

Foreplane assemblies 26 and 28 do not function to control the pitch of aircraft 10. That is accomplished by elevators 58 on aftplane units 30 and 32. Instead, as aircraft 10 slows down from cruise speed, elevators 58 incur more and more of the download required for a nose up, that is, positive, pitching moment. However, at level cruise flight where drag is a major concern, foreplane assemblies 26 and 28 trim to relieve the download on elevators 58 thus reducing the drag and allowing for stable and in-trim flight. The result is a more efficient airplane having a higher lift to drag ratio in cruise, even over and above previously suggested all-wing designs such as the Northrop wing.

Even where a third wing surface forward canard is employed to relieve some of the download produced by a typical horizontal stabilizer in combination with a conventional empanage arrangement, the canard, the wings and horizontal stabilizers all produce wing tip vortices which in turn produce induced drag. In this invention, only the outer wing panels have tips which produce wing tip vortices, further contributing to the overall efficiency of the all-wing aircraft 10.

None of the airfoil surfaces presented by center wing section 12, foreplane assemblies 26 and 28, aftplane units 30 and 32 and outer wing sections 18 and 20 require reflex. Instead, the washout of each of the outer wing sections 18 and 20 which is typical in conventional wings to delay outboard wing area stall is sufficient.

A second important function of foreplane assemblies 26 and 28 is to serve as mounting platforms for propulsion units 42 and 44. The airfoil defining planar members 31 of each foreplane assembly 26 and 28 provides space for an unobstructed placement of the engines forward on the wing sections thereby establishing a forward empty center of gravity. In addition, the need for extension drive shafts is eliminated in the case of pusher propeller design as depicted in the preferred embodiment of FIGS. 1–4 inclusive. In the case of previously suggested all-wing aircraft, the flying wings did not allow for engine placement in disposition to maintain an acceptable empty center of gravity without accompanying complexities and the added weight of an extended drive shaft for each engine.

On full scale embodiments of aircraft 10, conventional pylon mounted turbojet engines may be mounted on the undersides of foreplane elements 31 and extending forwardly from assemblies 26 and 28 in disposition such that exhaust gases may exit unobstructed therefrom for flow considerably above the upper surfaces of the trailing aftplane units 30 and 32. Where submerged turbojet engines are used as the power plants, extended intake ducting and accompanying inlet friction drag is reduced considerably.

A third function of the foreplane assemblies 26 and 28 is to allow mounting of flaps 40 at the trailing edges of planar elements 31 in close proximity to the center of gravity of the aircraft. Although prior flying wings such as the Northrop all-wing aircraft flew reasonably well in certain parameters of operation, it carried a heavy penalty of design compromise in order to satisfy marginal stability requirements. For example, the Northrop wing was unable to accommodate flap placement and flap effectiveness which was comparable to that of a conventional wing, fuselage and empanage configuration. This marginal stability upon displacement of flaps was a result of the high pitching moments imposed on the wing when the flaps were deployed. The amount of elevon trim in the Northrop wing required to offset flap deployment was essentially self-defeating. As the flaps were extended down, they created a nose down pitching moment. To offset this, the elevons and trim flaps had to be trimmed up. The net result was a minimum increase in lift and a large increase in drag. This can be attributed to the close relationship of the hinge points of the elevons and flaps, and the locations of the hinge points of the flaps with respect to the aircraft center of gravity.

Flaps 40 of each of the foreplane assemblies 26 and 28 of this invention are located sufficiently forward on the aircraft to be substantially aligned with and in close proximity to its center of gravity. Extension of flaps 40 causes a nose up pitching moment but that force is directly offset by the nose down pitching moment resulting from simultaneous deployment of the outboard, outer wing flaps 70 and the center wing section flaps 17. The net result of the pitching moment upon deployment of all six flaps is near zero. The six flaps of aircraft 10 make up about one-half of the total wing span, thereby greatly increasing the lift coefficient without an adverse effect on the pitch stability of the wing. As a consequence, the flaps 40 which are deployed simultaneously with all other flaps also provide a significant trim function.

A further important function of the foreplane assemblies 26 and 28 is to direct high energy air in a ducted fashion over the aftplane units 30 and 32 at slow air speeds. The force that elevators 58 are able to exert at slow speeds is augmented by deployment of the foreplane flaps 40 because of their close proximity to respective aftplanes. As the foreplane flaps 40 are lowered, the vertical distance between the undersurface of each foreplane element 31 to the upper surfaces of the aftplane members 48 is reduced, thus acting as a slot that ducts high energy air from the lower surface of the foreplane elements 31 to the upper surface of the aftplane members 48. This energized air flows over the elevators 58 for additional elevator pitch control which is especially advantageous at low air speeds.

C. Aftplane Units

The primary purposes of the aftplanes 30 and 32 fall into the categories of: (1) enhanced static and dynamic pitch and yaw stability; (2) provision of a mounting surface for pitch control elevators or ruddervators; (3) support structure for vertical stabilizers; (4) assuring structural spar continuity throughout the entire span of the wing; and (5) provision for a mounting surface for main landing gear trucks.

A significant function of the aftplane units 30 and 32 is to provide an extended aft surface which enhances the static and dynamic pitch and yaw stability of the aircraft. The V, U or box shape of the units 30 and 32, which extend downwardly below the lower surfaces of the wing sections inhibits pitching and yawing of the aircraft. As a result, the size of the vertical stabilizers for multi-engine airplanes can be decreased and in the case of single engine airplanes, the vertical stabilizers can be eliminated with an attendant increase in efficiency.

The yaw augmenters 60 mounted on the undersurface of planar members 50 of aft plane units 30 and 32 assist in static yaw stability by reducing spanwise flow of air under the aftplanes and creating the effect of a vertical stabilizer surface equal to the distance measured from the leading edge of a respective yaw augmenter to the undersurface of a corresponding aftplane member 50. Although the V, U or box shape of the aftplane units 30 and 32 in and of themselves without augmenter 60 enhances static yaw stability, the placement of the augmenters 60 reduces the adverse rolling tendency inherent in swept wings, and induces only a dynamic yawing moment to return the aircraft to straight flight. In effect, the surface area above the wing's center of gravity created by the vertical stabilizers 82 and the effective surface under the wing's center of gravity created by the aftplane planar members 48 and 50, enhanced by the augmenters 60 are nearly equal, and their sum induces a force just below the wing's center of gravity which generates a static and dynamic yaw stability without inducing a roll. The fact that the wings are swept back always induces a rolling moment as one wing advances and the other retreats if the airplane yaws from a static stability state. However, the yaw augmenters 60 dampen this effect and return the aircraft to straight flight.

The aftplane units 30 and 32 also function as means to mount the pitch controlling elevators 58. The aftplane members 48 and 50 have trailing edges which extend rearwardly of the trailing edges of the rest of the wing structure and provide a lever arm from the center of gravity of the aircraft superior to prior art all-wing designs. Alternatively, a portion of the trailing edges of the aftplane members 48 and 50 may be hinged to mount ruddervators, combining the functions of yaw and pitch control.

For larger sizes of multi-engine airplanes embodying the principles of this invention, it is desirable to provide an additional elevator force for pitch control. This can be accomplished by making the segments 52 of greater transverse width than those depicted in the drawings with the angularity of respective planar members 48 and 50 with respect to the horizontal being greater than shown in FIG. 2, and a portion of the trailing edge of this larger surface 52 hinged to act as an elevator.

Another important function of the aftplane units 30 and 32 is to provide an extended aft surface for support of vertical stabilizers 80 and 82 respectively when multi-engines are employed. Prior all-wing designs such as the Northrop wing employed drag inducing devices near the wing tips for yaw control. However, these devices generated a yawing force but little or no static yaw stability. It is to be appreciated that the swept back leading edge wing configuration of aircraft 10 and the Northrop wing result in some inherent static yaw stability but not enough to be acceptable. The vertical stabilizers 80 and 82 mounted on the extreme aft end of the aftplane members 48 and 50 respectively, cooperate with the aftplanes and yaw augmenters 60 to impart static and dynamic stability to the airplane. The net yaw force is just below the center of gravity of the airplane and a yawing force will not induce roll. The vertical stabilizers 80 and 82 serve as structure for mounting of corresponding upright rudders 86. Again, it should be noted that the vertical stabilizers 80 and 82 are not required on a single engine embodiment of this invention. The aftplane members 30 and 32 equipped with ruddervators and yaw augmenter 60 are sufficient for yaw control.

Aftplanes units 30 and 32 also add structural continuity to the entire span of the wing. The positions of the aftplane members 48 and 50 in relation to the center wing section 12 and the outer wing sections 18 and 20 are such that an aft section main spar may be used which runs the entire linear span of the wing without fore and aft diversion from a straight line.

The segments 52 of aftplane units 30 and 32 also offer a supporting platform for mounting of main landing gear trucks 72 and 74 are of relatively short overall length which places them forward near the center of gravity of the airplane to allow for ease of rotation for establishment of a takeoff attitude at velocity rotate.

D. Outer Wing Panels

The outer wing sections 18 and 20 serve as: (1) lifting surfaces aft of the foreplane assemblies 26 and 28 and aft of the center wing section 12 center of lift and a lifting surface forward of the aftplane units 30 and 32; (2) a surface for mounting of outboard flaps 70; (3) a means for eliminating foreplane tip vortices; and (4) a surface for convenient adjustment of the drag line of the entire airplane.

In level cruise flight, all wing surfaces of aircraft 10 provide lift. Although the airplane is equipped with elevators 58, they also add lift in cruise flight and act only as a trim function in unison with the foreplane flaps 40. The airplane stabilizes because of the positive pitching moment generated by the foreplane assemblies 26 and 28.

The size of the outer wing sections and their airfoil shapes are determined by the chosen center of gravity of the entire all-wing structure. That is to say, the center of gravity and the center of lift can be moved aft if longer and larger outer wing sections are used to accommodate a single engine mounted aft on the trailing edges of the center wing section 12 of aircraft 10. This would be desirable in the case of a remote pilot vehicle with a single engine. Again, the size of the outer wing sections and their airfoil shapes are matters of design choice and can be changed as required for a particular airplane. Consequently, the center of lift and gravity of the aircraft can be varied depending upon parameters established at the time of initiation of the design.

It is important to take into account though in designing aircraft 10 for a particular application that center section 12, foreplane assemblies 26 and 28, aftplane units 30 and 32, and the outer wing sections 18 and 20 interact aerodynamically and the sum of their net lifting force must be coordinated to produce a specific lift and pitching moment in relation to the center of gravity of the airplane.

By virtue of direct connection of the outer wing panels to the foreplane assemblies 26 and 28 and the aftplane units 30 and 32, the leading edges of the outer wing sections may be directly aligned with the leading edges of corresponding foreplane assemblies 26 and 28. The result is a constant leading edge for the entire wing. This provides for structural integrity because a forward spar may be provided which runs the entire span of each wing section starting from the nose apex of the center section outwardly to the wing tips. Aerodynamic efficiency is increased with the common leading edge because the wing tips of the foreplane assemblies become part of the outer wing panels without generating a tip vortex that would increase induced drag.

Because all axes of movement of the aircraft, i.e. pitch, roll and yaw, intersect at the center of gravity, the airplane rotates about that center point. Lift behind the center of gravity causes a nose down pitch. Drag can cause a rotation about an axis. If the center of drag of a surface of an airplane is above or below the center of gravity, that surface will have a lever arm and a force inducing sufficient drag to cause rotation about an axis. The vertical position of the outer wing sections 18 and 20 with respect to the center wing section 12 and the foreplane assemblies 26 and 28 and aftplane units 30 and 32 has an effect on the total drag line of the airplane. As viewed from the rear of aircraft 10 looking forward at the trailing edges, the aftplane assemblies 30 and 32 define a V, U or box shape below the airplane and create a drag line therebelow. This generates a nose down pitching moment.

The center wing section 12 and engine nacelles 42 and 44, on the other hand, form a shape that creates a specific drag line above the airplane. This creates a slight nose up pitching moment. Generally speaking the sum of this drag is not equal to the aftplane drag. Therefore, placement of the outer wing sections 18 and 20 above or below an imaginary lateral optimum drag line will adjust the total drag line of the airplane. The design objective is to place the outer wing sections in vertical dispositions relative to the center of gravity and thereby lift so minimum or no pitching moments nose up or nose down are generated by drag when the aircraft is in stabilized cruise configuration. By accomplishment of this objective, there is no need for the elevator to be used in an effort to trim out unneeded pitching moments and as a result, the drag of the total wing is reduced.

E. Wing Fences and Forward Sections of Vertical Stabilizers

The forward sections 88 of vertical stabilizer structures 80 and 82 extend from near the leading edges 14 of center wing section 12 and from near the leading edges 34 of foreplane assemblies 26 and 28 until they merge smoothly with the upwardly swept rear main portions of the stabilizers. Similarly, wing fences 38 are provided at the zones of juncture of foreplane assemblies 26 and 28, and aftplane units 30 and 32 with corresponding outer wing sections 18 and 20.

The open space between foreplane assemblies 26 and 28 and aftplane units 30 and 32 allows high pressure, high energy air from the undersurface of foreplane elements 31 and the undersurface of the center wing section 12 to join at the opening creating vortices that try to climb up over the upper surface of the center wing section low pressure area. The stabilizer fence extensions 88 restrict this high pressure, high energy air from travelling over the center wing section and limit such air to flow over the upper surfaces of the aftplane units 48, thus reducing its intensity and reducing drag.

In like measure, the outboard fences 38 prevent such high pressure, high energy air from flowing out over the lift producing surfaces of outer wing sections 18 and 20. High pressure, high energy air from the undersurface of foreplane assemblies 26 and 28 seeks to climb over the inboard edges of the outer wing sections 18 and 20 through the space between the foreplane assemblies 26 and 28 and the aftplane units 30 and 32, after it leaves the undersurface of the foreplane assemblies 26 and 28. This high pressure, high energy air tends to rotate toward the outer tip of each of the outer wing sections 18 and 20. Because all leading edges of the entire wing sweep back approximately 30°, a spanwise flow of air is generated. Any break of the smooth surface of the leading edges will cause a vortex to generate rotating toward the center of the airplane and travelling aft along the chord. The location where the foreplane assemblies 26 and 28 meet respective outer wing sections 18 and 20 is a potential break of the smooth surface. This vortex will collide with the other vortex described because they are counter-rotating and thus result in an increase in induced drag. In order to ameliorate this condition, the fences 38 split and separate the counter-rotating vortices and assure that a single smooth vortex core airflow takes place over the upper surface of aftplane units 50, and assure that a smooth single vortex core rotates toward the center of the airplane and travels unimpeded over the outer wing sections' upper surface toward the trailing edge of the wing sections. This reduces induced drag.

DETAILED DESCRIPTION OF THE SINGLE-ENGINE ALL-WING AIRCRAFT EMBODIMENT

Figure 5:
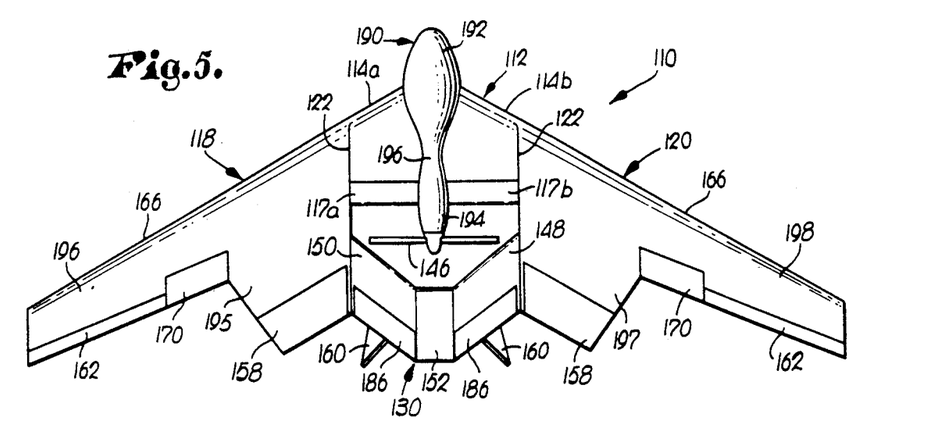
FIG. 5 is a plan view of a single engine embodiment of the all-wing aircraft.
Figures 6, 7, 8:
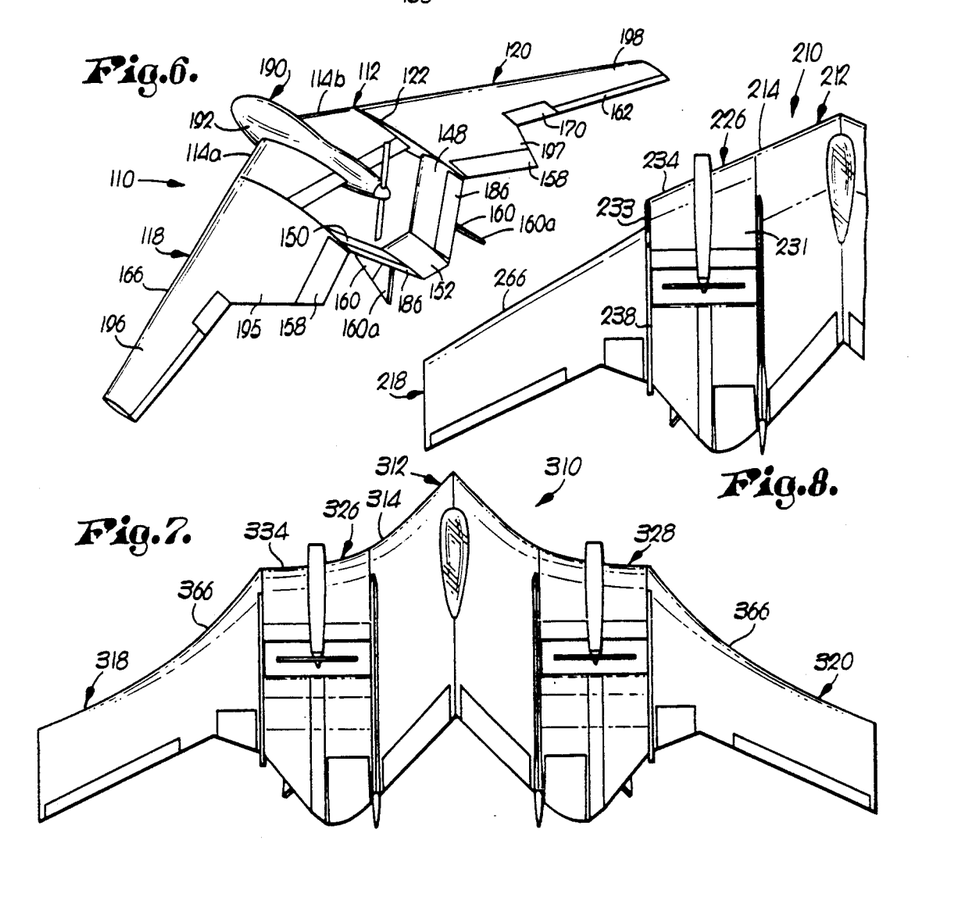
FIG. 6 is a perspective rear quarter view of the single engine all-wing aircraft of FIG. 5.
FIG. 7 is another embodiment of the multi-engine all-wing aircraft of this invention, illustrating a scalloped leading edge wing configuration.
FIG. 8 is a fragmentary plan view of a second embodiment of the multi-engine all-wing aircraft wherein the outer wing sections are stepped back from the leading edge of the center wing section.

The single-engine all-wing aircraft 110 illustrated in FIGS. 5 and 6 is in many respects similar to multi-engine all-wing aircraft 10 and therefore only components significantly different from the multi-engine version will be described in particular detail.

One major difference is the fact that aircraft 110 has a center section 112 which in many respects combines the functions of center wing section 12 and foreplane assemblies 26 and 28 of the multi-engine version of the invention. Furthermore, center wing and foreplane section 112 serves as a support for a combination cabin and power plant nacelle envelope 190. Center wing and foreplane section 112 has leading edges 114a and 114b which are at an angle to one another and which converge as the forward extremity of envelope 190 is approached to present a swept back shape at a 30° angle similar to the leading edge 14 of aircraft 10. The combination center wing and foreplane section 112 defines an airfoil in a fore and aft direction which terminates in a pair of deployable flaps 117a and 117b between opposed sides 122 of the section 112.

The combination foreplane section and center section 112 performs a function similar to the foreplane assemblies 26 and 28 of aircraft 10 in that the segments thereof on opposite sides of cabin and nacelle envelope 190 produce a positive pitching moment while at the same time functioning as a mounting surface for the flaps 117a and 117b.

Envelope 190 has a bulbous, essentially tear-drop shaped forward cabin 192 which merges and blends smoothly and aerodynamically with the rearwardly disposed engine nacelle 194 through an intermediate pinched waist 196. The power plant within nacelle 194 is illustrated as driving a pusher prop 146 but it is again to be appreciated that a turbo-prop or turbojet may be substituted for the reciprocating engine schematically depicted.

Outer wing sections 118 and 120 connected to the sides of combination center wing and foreplane section 112 each have a leading edge 166 which merges smoothly with and is at the same angle as the leading edges 114a and 114b of section 112. The aft-extending rear portions 195 and 197 of outer wing sections 118 and 120 respectively serve as means for mounting movable elevators 158. The outboard portions 196 and 198 of outer wing sections 118 and 120 are provided with trailing edge aft flaps 170 adjacent portions 195 and 197. The remaining trailing edges of outboard portions 196 and 198 of outer wings 118 and 120 are occupied by deflectable ailerons 162 which extend the full distance between flaps 170 and the tips of the wing sections. Although not illustrated in FIGS. 5 and 6, it is to be understood that outer wing sections 118 and 120 may be provided with wing tip extensions similar to the extensions 68 of aircraft 10 as depicted in FIG. 2.

Aftplane unit 130 has a pair of downwardly extending angular planar members 148 and 150 which are joined at their lower ends by an aftplane segment 152. The members 148 and 150 as well as segment 152 define an airfoil between the front and trailing edges thereof. The aft portions of aftplane members 148 and 150 are each provided with movable rudders or ruddervators 186.

Yaw augmenters or strakes 160 are mounted on the undersides of members 148 and 150 in disposition oriented fore and aft of the members and projecting in a direction perpendicular to the under surface of each of the members 148 and 150. Yaw augmenters 160 serve the same function as the yaw augmenters 60 of multi-engine aircraft 10. In order to permit free movement of ruddervators 186, the rear segments 160a of each of the strakes or yaw augmenters 160 move with a corresponding elevator or ruddervator 186, while the front segments 160b of each strake 160 are stationary with respect to the corresponding aftplane members 148 or 150.

ALTERNATIVE EMBODIMENTS OF MULTI-ENGINE AIRCRAFT

The alternative embodiment of multi-engine aircraft 210 illustrated in FIGS. 8 and 9 is similar to aircraft 10 with the primary difference being the provision of a center wing section 212 which has a leading edge 214 at less of a V-defining angle than leading edge 14 of aircraft 10. The outer wing sections 218 are at a 30° angle similar to the angularity of wing sections 18 and 20. As a consequence, and as best shown in FIG. 8, there is a step-back of the leading edge 266 of each of the outer wing sections 218 from the leading edge 234 of foreplane assemblies 226. In order to prevent drag inducing wing tip vortices from being generated by the outer edges of airfoil defining foreplane elements 231, upstanding winglets 233 (see FIG. 9) are mounted on each foreplane element 231 at the point where such elements join with a respective outer wing section 266.

In a third alternative embodiment of the multi-engine all-wing aircraft as shown in FIG. 7, and designated generally by the numeral 310, the leading edges of the wing sections and foreplane assemblies present an overall scalloped appearance when viewed from above. Thus, the leading edge 314 of center wing section 312 has an arcuate outwardly flared configuration which blends with the arcuate leading edges 334 of foreplane assemblies 326 and 328. In like manner, the leading edges 366 of outer wing sections 318 and 320 are curved to present an effective 30° angle with respect to the foreplanes and the center section of the aircraft. All of the operating components of aircraft 310 are the same as those illustrated and described with respect to multi-engine aircraft 10.

Step-back of the leading edge of the outer wing sections of the all-wing aircraft of this invention accomplishes two major functions.

The first is essentially a structural consideration. The tip chord of the foreplane assemblies is maintained fairly short in order to assure that the trailing edges of the foreplane elements are in perpendicular relationship with respect to the fore and aft center line of the aircraft. In order to increase the tip chord of the foreplane elements, stepping forward of the leading edges of the center section and the foreplane elements in relation to the outer wing sections increases the tip chord of the foreplanes and provides a larger area for structural spars and bracing. In addition, the stepped forward foreplane has a small wing tip equal in length to the step-forward. An aerodynamic advantage is thereby obtained by virtue of the fact that the vortex generated at such forward step increases the lift of the outer wing panels as the high suction core of each vortex travels the distance of the chord line of the outer wing panels as it joins the foreplane tip and the aftplane members at the fences 238. The small winglets 233 reduce the drag generated by the vortex.

Scalloping of the leading edge of the all-wing aircraft as depicted in FIG. 7 may be carried out if desired for two specific reasons. The first is primarily a structural function. The point where each of the foreplanes elements 31 merge with a respective outer wing section 18 or 20 represents a physical limitation of the chord at the outer edge, if the trailing margin of the foreplane elements 31 are to remain perpendicular to the fore and aft center line of the aircraft. It is desirable to maintain the trailing edges of elements 31 at 90° with respect to the center line so that the prop fan or propeller plane of rotation is parallel with the trailing edges of the foreplane assemblies 26 and 28. This reduces inlet turbulence to the props and allows for a smoother operation without buffeting and concomitant vibration. Without scalloping of the leading edges of the aircraft, the outermost chord of each foreplane assembly is relatively short to permit desirable forward positioning of the foreplane assemblies 26 and 28. Such forward placement of the foreplanes assures adequate positive pitching moment and allows for placement of the power plants 42 and 44 in disposition to maintain the empty center of gravity without extension shafts between the engines and the props. The somewhat narrow foreplane tip chord can be increased and still maintain the forwardly positioned foreplane trailing edges perpendicular to aircraft center line, if the leading edges of the wing sections and foreplanes are scalloped as illustrated in FIG. 7.

Scalloping of the wing sections and the foreplanes also allows for increased flap area on the foreplanes by virtue of the fact that the hinge point of the flap can be moved forward and still provide adequate area to place spars and structural bracing members.

A second reason for scalloping the leading edges of the wing sections and foreplanes is aerodynamic in nature. Any swept-back wing design has at least two basic airflow patterns. One is chordwise of the wing and the other is spanwise airflow over the wing. Spanwise flow of air reduces wing lift coefficients and enlarges wing tip vortices that increase induced drag at higher angles of attack. By curving the leading edges of the wing sections and foreplane assemblies, spanwise flow of air across the wing sections is reduced, vortices are decreased, resulting in more chordwise flow of air.

The center wing section 12 of aircraft 10 may also be extended in order to permit a third propulsion plant and pusher configuration to be mounted on the center wing section. Also, for a full size sport or remote pilot vehicle, the basic multi-engine plan form can become a single engine by removing engines 42 and 44 and retaining the single engine pusher on the center section. Placing telemetry and/or radar equipment far forward on the center section will maintain the required center of gravity.

In summary, the present invention provides means for generating inherent static and dynamic stability about the pitch and yaw axes of an all-wing tailless airplane by producing lift and yaw forces produced by the combination of a series of blended flowing form wing sections that are structurally common and intrinsic, and impose different lift and yaw forces coordinated such that the sum thereof results in a single specific lift, a single specific yaw in relation to the center of gravity, and a specific stabilizing pitch and yaw moment in relation to the center of gravity of the airplane.

I claim:
1. In an all-wing aircraft, the combination of:
   a center wing and foreplane section provided with a leading edge and a trailing edge, said center wing section being configured to define an airfoil between the leading and trailing edges thereof;
   a pair of outer wing sections each having a leading edge and a trailing edge, each of said outer wing sections being shaped to present an airfoil between respective leading and trailing edges thereof;
   means joining the outer wing sections to opposed sides of the center wing section in disposition such that the outer wing sections extend outwardly in opposite directions away from the center wing section, at least a part of said center section being located ahead of the center of lift of the wing sections in disposition to generate a positive pitching moment when the aircraft is in flight; and aftplane means associated with the wing sections and including at least two airfoil defining, generally planar members each having a leading edge and a trailing edge, the members being disposed with the leading edges and trailing edges thereof oriented transversely of the aircraft with at least a part of the leading edges of each aft of the leading edges of the wing sections, said members also extending downwardly below the wing sections in disposition for airflow therebetween and thereover and dimensioned and located aft of the center of gravity to enhance the static and dynamic pitch and yaw stability of the aircraft, said generally planar members being disposed at an angle with respect to one another transversely of the aircraft and converging as the outer portions thereof are approached in a direction downwardly from the wing sections.

2. An all-wing aircraft as set forth in claim 1, wherein is included power plant means carried by the wing sections for imparting forward motion to the aircraft.

3. An all-wing aircraft as set forth in claim 1, wherein is provided shiftable means for controlling the pitch attitude of the aircraft.

4. An all-wing aircraft as set forth in claim 3, wherein said shiftable means comprises elevators at the trailing edges of the outer wing sections located inboard of such outer sections adjacent the aftplane members.

5. An all-wing aircraft as set forth in claim 1, wherein said aftplane generally planar members are provided with movable rudder means adjacent the trailing edges thereof.

6. An all-wing aircraft as set forth in claim 1, wherein said aftplane generally planar members are provided with movable ruddervator means adjacent the trailing edges thereof.

7. An all-wing aircraft as set forth in claim 1, wherein is provided means joining said outer portions of the generally planar members.

8. An all-wing aircraft as set forth in claim 1, wherein is provided cockpit defining means on the center wing section for a pilot of the aircraft.

9. An all-wing aircraft as set forth in claim 1, wherein the leading edges of each of the outer wing sections is stepped back from the leading edge of the center wing section.

10. An all-wing aircraft as set forth in claim 9, wherein is provided upstanding winglets on opposed side of the center wing section between the leading edges of respective outer wing sections and the leading edge of the center wing section.

11. An all-wing aircraft as set forth in claim 1, wherein the leading edges of the center wing section, the foreplane assemblies and the outer wings are configured to define a scalloped leading edge.

12. An all wing aircraft as set forth in claim 1, wherein is provided yaw augmenters mounted on the undersides of the aftplane units in disposition oriented fore and aft of respective aftplane members and projecting in a direction outward from the undersurfaces thereof.

13. In an all-wing aircraft, the combination of:

an airfoil defining center wing section having a leading edge and a trailing edge;

airfoil defining outer wing sections each having a leading edge and a trailing edge;

foreplane means joining each of the outer wing sections to a respective side of the center wing section with the outer wing sections extending outwardly in opposite directions in spaced relationship from the sides of the outer wing section, said foreplane means each including an airfoil defining, generally planar element connected to a respective outer wing member and an opposed side of the center wing section such that the corresponding outer wing section is spaced outwardly from the center wing section, each of the foreplane elements having a leading edge and a trailing edge extending transversely of the aircraft, at least a part of said foreplane elements being located ahead of the center of lift of the wing sections in disposition to generate a positive pitching moment when the aircraft is in flight; and aftplane means extending between each of the outer wing sections and the center wing section aft of an adjacent foreplane, each of said aftplane means including at least two airfoil defining, generally planar members each having a leading edge and a trailing edge, the members of each aftplane means being disposed with the leading edges and trailing edges thereof oriented transversely of the aircraft, said members of each of the aftplane means extending downwardly below the adjacent foreplane in disposition for airflow therebetween and thereover, at least a part of said aftplane members being located behind the center of gravity in disposition to generate forces that induce static and dynamic pitch and yaw stability.

14. An all-wing aircraft as set forth in claim 13, wherein is provided power plant means carried by each of the foreplane elements for imparting forward motion to the aircraft.

15. An all-wing aircraft as set forth in claim 13, wherein said power plant means each has a pusher propeller, said aftplane extending downwardly a sufficient distance for each pusher propeller arc of rotation to be unobstructed.

16. An all-wing aircraft as set forth in claim 13, wherein is provided movable elevators on the trailing edges of at least one member of each of the aftplane means for controlling the pitch attitude of the aircraft.

17. An all-wing aircraft as set forth in claim 13, wherein is provided movable rudder means on the trailing edge of at least one member of each of the aftplane means for controlling yaw.

18. An all-wing aircraft as set forth in claim 13, wherein is provided a movable ruddervator on at least one member of each of the aftplane means for controlling pitch and yaw.

19. An all-wing aircraft as set forth in claim 13, wherein said generally planar members of each of the aftplane means are disposed at an angle relatively to present a pair of relatively V-shaped aftplanes, joined near the apex of the V-shape thereof by a third member of substantial transverse width with respect to the horizontal, and wherein is provided movable elevator means on the trailing edge of the said horizontal third member.

20. An all-wing aircraft as set forth in claim 13, wherein is provided vertical stabilizers projecting upwardly from opposite sides of the center wing section adjacent the trailing edge thereof and the movable rudder adjacent the rear portion of each vertical stabilizer.

21. An all-wing aircraft as set forth in claim 13, wherein is provided movable means on the outer wing sections to control roll of the aircraft about the longitudinal axis thereof.

22. An all-wing aircraft as set forth in claim 13, wherein is provided flap means on the trailing edge of the center wing section.

23. An all-wing aircraft as set forth in claim 13, wherein is provided flap means on the trailing edges of each of the foreplane elements.

24. An all-wing aircraft as set forth in claim 21, wherein is provided flap means on the trailing edges of the outer wing panels inboard of the roll control means.

25. An all-wing aircraft as set forth in claim 21, wherein is provided flap means on the trailing edges of the center wing section, the trailing edges of the outer wing panels inboard of the roll control means, and the trailing edges of each of the foreplane elements, said foreplane element flap means being disposed such that when deployed, the foreplane element flaps generate a positive pitch trim function to offset the negative pitch moment generated by deployment of the center wing section flaps and the outer wing section flaps.

26. An all-wing aircraft as set forth in claim 13, wherein is provided yaw augmenters mounted on the undersides of the aftplane units in disposition oriented fore and aft of respective aftplane members and projecting in a direction outward from the undersurfaces thereof.

27. An all-wing aircraft as set forth in claim 13, wherein said generally planar members of each of the aftplane means are disposed at an angle relatively to present a pair of relatively V-shaped aftplanes.

28. An all-wing aircraft as set forth in claim 13, wherein is provided wing fences at the zones of juncture of the foreplane elements and the outer wing sections and the zones of juncture of the aftplane members and the center wing sections.

29. An all-wing aircraft as set forth in claim 13, wherein is provided a retractable main landing gear mounted on the most forward extremity and underside of the aftplane units in disposition forward near the center of gravity to facilitate rotation of the airplane for establishment of a takeoff attitude at velocity rotate.

30. In an all-wing aircraft, the combination of:
a center wing and foreplane section provided with a leading edge and a trailing edge, said center wing section being configured to define an airfoil between the leading and trailing edges thereof;
a pair of outer wing sections each having a leading edge and a trailing edge, each of said outer wing sections being shaped to present an airfoil between respective leading and trailing edges thereof;
means joining the outer wing sections to opposed sides of the center wing section in disposition such that the outer wing sections extend outwardly in opposite directions away from the center wing section,
at least a part of said center section being located ahead of the center of lift of the wing sections in disposition to generate a positive pitching moment when the aircraft is in flight;
aftplane means associated with the wing sections and including at least two airfoil defining, generally planar members each having a leading edge and a trailing edge,
the members being disposed with the leading edges and trailing edges thereof oriented transversely of the aircraft with at least a part of the leading edges of each aft of the leading edges of the wing sections,
said members also extending downwardly below the wing sections in disposition for airflow therebetween and thereover and dimensioned and located aft of the center of gravity to enhance the static and dynamic pitch and yaw stability of the aircraft;
movable means on each of the outer wing sections for controlling rolling movement of the aircraft about the longitudinal axis thereof;
movable flap means on said outer wing section adjacent the trailing edges thereof inboard of the movable means for controlling roll; and
movable flap means on said center wing section adjacent the trailing edges thereof in disposition such that when the flap means is deployed it generates a positive pitch trim function to offset the negative pitch moment generated by deployment of the outer wing section flaps.

* * * * *